United States Patent [19]

Gerlach

[11] Patent Number: 4,667,091
[45] Date of Patent: May 19, 1987

[54] DEVICE FOR AUTOMATICALLY TRACKING A MOVING OBJECT

[75] Inventor: Manfred Gerlach, Bremen, Fed. Rep. of Germany

[73] Assignee: Fried. Krupp Gesellschaft mit beschränkter Haftung, Essen, Fed. Rep. of Germany

[21] Appl. No.: 706,304

[22] Filed: Feb. 27, 1985

[30] Foreign Application Priority Data

Mar. 1, 1984 [DE] Fed. Rep. of Germany ....... 3407588

[51] Int. Cl.$^4$ ................................................ G01J 1/20
[52] U.S. Cl. ................................. 250/203 R; 356/152
[58] Field of Search .................... 250/203 R, 234–236; 356/1, 141, 152

[56] References Cited

U.S. PATENT DOCUMENTS 4,119,379 10/1978 Zindler ................................. 356/152
4,123,165 10/1978 Brown et al. .................... 250/203 R
4,401,886 8/1983 Pond et al. .......................... 356/141

OTHER PUBLICATIONS

Oriel Corp. "Complete Catalog of Optical Systems & Components" published Jun. 1979, p. J25.

Primary Examiner—David C. Nelms
Attorney, Agent, or Firm—Spencer & Frank

[57] ABSTRACT

In a device for automatically tracking a moving object, which device includes: an optical measuring head rotatable about vertical and horizontal axes, the measuring head having first and second light transmitters for producing and emitting, respectively, a horizontally and a vertically sharply collimated light beam along respective beam axes, the transmitters being operative to cyclically sweep the beam axes horizontally and vertically, respectively, over given ranges about zero positions, and an optical receiver mounted to receive light echoes generated by reflections of the transmitted beams and having an optical axis oriented parallel to the beam axes when at the zero positions. The device further includes motorized horizontal and vertical servo drives connected for rotating the measuring head about the vertical and horizontal axes, regulating circuits connected to the receiver for converting the amplitude of the momentary deflection of the beam axes from their zero positions when a light echo of the beam emitted by each light transmitter is received by the receiver to a setting value for an associated servo drive to adjust the orientation of the measuring head in the sense of reducing that amplitude of the momentary deflection of the associated beam axis; and control elements connected to the first and second light transmitters for causing each transmitter to produce its associated light beam during successive, spaced periods.

13 Claims, 3 Drawing Figures

DEVICE FOR AUTOMATICALLY TRACKING A MOVING OBJECT

BACKGROUND OF THE INVENTION

The present invention relates to a device for automatically tracking a moving object.

In a known device of this type DE-OS [Federal Republic of Germany Laid-Open Patent Application ]No. 3,128,433, a measuring head, which is used simultaneously as a range finder, automatically follows a horizontally moving object equipped with reflectors, generally called a target, even if the target moves at a high velocity, e.g. at up to 60 km/h. Relatively low transmitting power is required for tracking the target.

However, this automatic target tracking system is limited to an object which moves essentially only in one plane, with slight displacement components of the object in a direction perpendicular thereto not causing any problem. This known device fails, however, if the perpendicular displacement component becomes large, and thus does not permit tracking of an object moving three-dimensionally in space.

SUMMARY OF THE INVENTION

It is therefore an object of the present invention to make possible the automatic tracking of a target of the above-mentioned type in such a way that three-dimensional displacement components of the target can be tracked reliably with the same good precision.

The above and other objects are achieved, according to the present invention, in a device for automatically tracking a moving object, which device includes: an optical measuring head rotatable about vertical and horizontal axes, the measuring head having a first light transmitter for producing and emitting a horizontally sharply collimated light beam along a first beam axis, the first transmitter being operative to cyclically sweep the first beam axis horizontally over a given range about a zero position, and an optical receiver mounted to receive light echoes generated by reflections of the transmitted beam and having an optical axis oriented parallel to the first beam axis when the first beam axis is at the zero position, the device further including motorized horizontal and vertical servo drives connected for rotating the measuring head about the vertical and horizontal axes, and a first regulating circuit connected to the receiver for converting the amplitude of the momentary horizontal deflection of the first beam axis from its zero position when a light echo of the beam emitted by the first light transmitter is received by the receiver to a setting value for the horizontal servo drive to adjust the horizontal orientation of the measuring head in the sense of reducing that amplitude of the momentary horizontal deflection of the first beam axis. According to the invention, the optical measuring head further has a second light transmitter for producing and emitting a vertically sharply collimated light beam along a second beam axis, the second transmitter being operative to cyclically sweep the second beam axis vertically over a given range about a zero position, the zero position of the second beam axis being parallel to the optical axis of the receiver and the device further includes: a second regulating circuit connected to the receiver for converting the amplitude of the momentary vertical deflection of the second beam axis from its zero position when a light echo of the beam produced by the second transmitter is received by the receiver to a setting value for the vertical servo drive to adjust the vertical orientation of the measuring head in the sense of reducing that amplitude of the momentary vertical deflection of the second beam axis; and control means connected to the first and second light transmitters for causing each transmitter to produce its associated light beam during successive, spaced periods.

With the apparatus according to the present invention, not only is it possible to effect reliable, automatic, high precision target tracking of objects moving in space, but transmitting power and transmitting energy density required for this purpose are kept so low that, if laser transmitters are used, accident prevention requirements can be observed for the necessary transmitting range. The latter is accomplished by having the two transmitters transmit alternatingly which, additionally, offers an opportunity to control the regulating circuits for both the vertical and the horizontal servo drives with the same optical receiver.

According to an advantageous feature of the invention, the first and second transmitters are operated for causing the cyclic sweeping of one transmitted beam axis through its associated zero position to be shifted in phase by 90° relative to the cyclic sweeping of the other transmitted beam axis through its associated zero position, and the control means are operative for causing each transmitter to produce a beam only during each one-fourth of a sweep cycle centered on the zero position of the associated given range. With these measures, the transmitter transmits only in that section of the oscillating period of the transmitters in which the latter move with the greatest speed. In conjunction with the phase shift between the pivoting movements of the two transmitters, the latter transmit only alternatingly and never simultaneously.

According to another advantageous feature of the present invention, the beam produced by each transmitter during each period is composed of a succession of light pulses at a repetition rate substantially higher than the frequency of the cyclic sweeping of the associated beam axis. With this measure, a considerable range can be covered by the device at low transmitting power so that tracking of far distant targets becomes possible. At the same time, the measuring head can be utilized as the transmitting and receiving member for an active optical range finder.

According to a further advantageous feature of the invention, each transmitter is composed of an objective lens, a light producing diode, and means for imparting to the diode an oscillatory movement, for producing the associated beam axis sweep, in the focal plane of the objective lens, the receiver includes an objective lens, and all of the objective lenses have optical axes oriented parallel to one another. This provides for simple reduction to practice for the oscillating transmitters. However, in principle, it is also possible to arrange the transmitting diode so that it is fixed in the focal plane and to have the objective lenses of the transmitters oscillate horizontally and vertically, respectively in a plane oriented transversely to the optical axis of the objective lenses.

The invention will be described in greater detail below with reference to an embodiment which is illustrated in the drawing._

DESCRIPTION OF THE PREFERRED EMBODIMENTS

Figure 1:
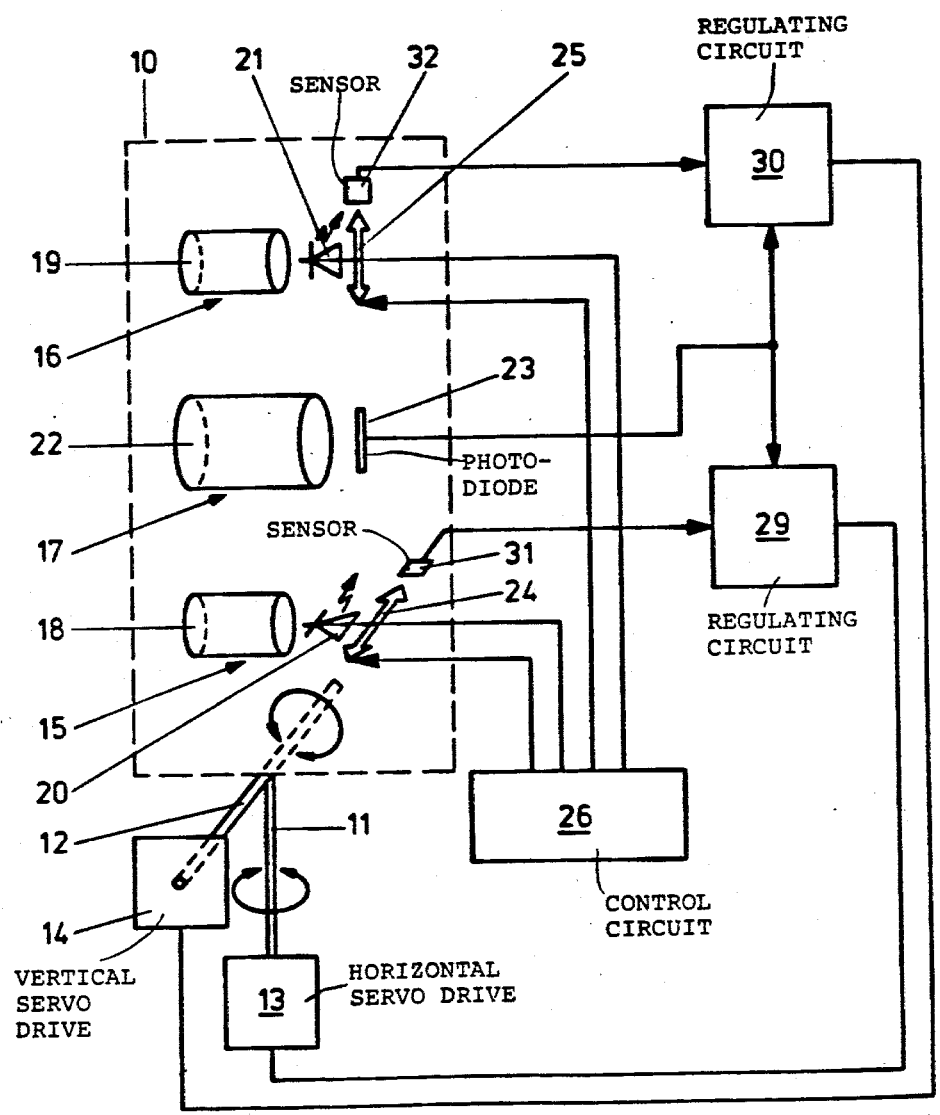
FIG. 1 is a schematic block circuit diagram of a target tracking device according to the invention.

The target tracking device shown schematically in the block circuit diagram of FIG. 1 is usually employed in conjunction with a continuous determination of the location of the path of movement of an object. The illustrated device includes a measuring head 10 which is arranged to be rotatable about a vertical axis 11 and about a horizontal axis 12, for example on a tripod firmly set up in the terrain. A motorized horizontal servo drive 13 is provided to rotate measuring head 10 about its vertical axis 11 and a motorized vertical servo drive 14 is provided to rotate measuring head 10 about its horizontal axis 12. These servo drives 13 and 14 are able to rotate measuring head 10 about the respective axes 11, 12 in both directions, as indicated in FIG. 1 by corresponding arrow symbols.

To permit such rotation about two mutually perpendicular axes, drive 13 can be fastened to the tripod with its axis 11 fixed to a frame. The frame, in turn, can support drive 14 and its axis 12 is fixed to, and supports, head 10. Such arrangement is conventional and therefore is not shown in detail.

Measuring head 10 is composed of a first light transmitter 15, a second light transmitter 16 and a light receiver 17. Each transmitter 15 and 16 is composed of an objective lens 18 or 19, respectively, and a light source in the form of a laser transmitting diode 20 or 21, respectively arranged in the focal plane of objective lens 18 or 19, respectively. Receiver 17 is composed of an objective lens 22 and a photodiode 23 arranged in the focal plane of lens 22. Photodiode 23 detects light impinging through objective lens 22 as a result of the transmission of light by transmitters 15, 16 and reflection at a ring of annularly arranged triple reflectors disposed at the target.

Such triple reflectors or corner reflectors are distributed by Oriel Corporation, Stamford, Conn. U.S.A. as Model No. 4601 or 4602 (see Oriel Corp. complete catalog of Optical Systems & Componentes, published June 1979, page J25).

The optical axes of objective lenses 18, 19 and 22 are oriented parallel to one another and lie in one vertical plane. Objective lenses 18 and 19 of transmitters 15 and 16 are arranged symmetrically to objective lens 22 of receiver 17.

Laser diodes 20 and 21 of the two transmitters 15 and 16 each undergo a continuous periodic oscillating movement having a given maximum amplitude along circular arcs in the respective focal planes of objective lenses 18 and 19, with laser transmitting diode 20 of the first transmitter 15 oscillating in the horizontal direction and laser transmitting diode 21 of the second transmitter 16 oscillating in the vertical direction. For this purpose, laser transmitting diodes 20 and 21 are each disposed on a vibratory spring 24 or 25, respectively, as indicated by the arrow symbol in FIG. 1, each being driven by an electromagnet. The configuration and operation of the vibratory drive for each vibratory spring 24 and 25 is described in detail in DE-OS No. 3,128,433.

Figure 2:
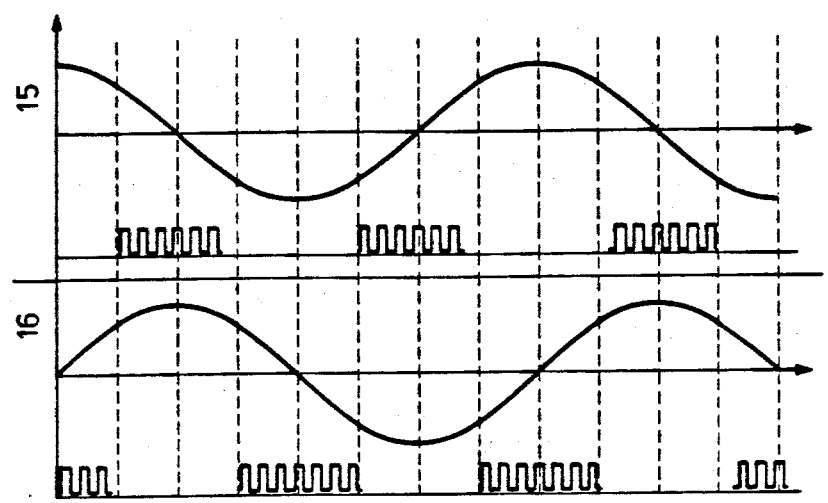
FIG. 2 is a diagram depicting the oscillating motion of the horizontally oscillating transmitter and of the vertically oscillating transmitter, and showing the association of the transmitting periods of the transmitters of the target tracking device of FIG. 1 with their oscillating movements.

The electromagnetic drives for vibratory springs 24 and 25 are controlled by a control circuit 26 in such a manner that laser transmitting diode 20 of first transmitter 15 performs a periodic oscillation as represented by the upper curve of FIG. 2 and laser transmitting diode 21 performs a periodic oscillation as represented by the lower curve of FIG. 2, each curve showing one and a half oscillating periods. As already mentioned, the oscillating paths are generally perpendicular to one another. As can be seen in FIG. 2, the oscillations of the two laser transmitting diodes are shifted in phase by 90° with respect to one another.

Laser transmitting diodes 20 and 21 transmit laser pulses at a transmitting pulse repetition rate which is substantially greater than the frequency of their oscillating movements. Control circuit 26 also actuates laser transmitting diodes 20 and 21 in such a manner that only one of the two laser transmitting diodes 20, 21 at a time emits a laser pulse train, the laser pulse trains emitted by one diode alternating with those emitted by the other diode. The laser pulse trains are shown in FIG. 2 immediately below the respective oscillating movement curves of the associated laser transmitting diode 20, 21.

Figure 3:
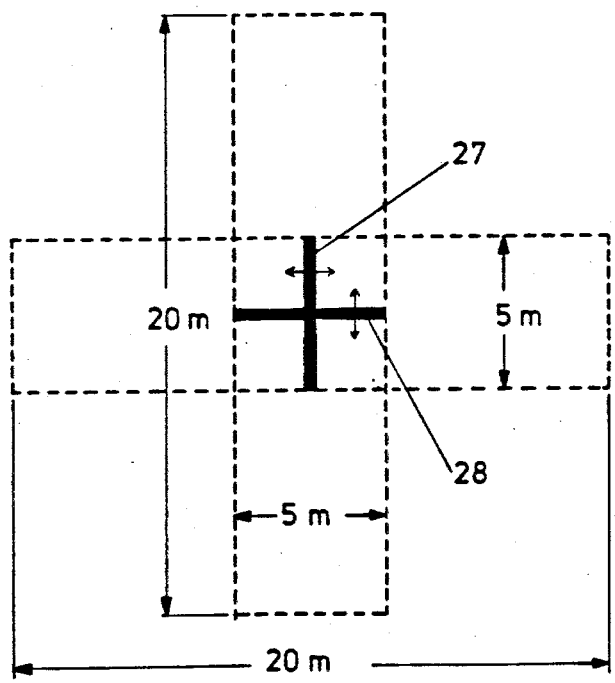
FIG. 3 is a pictorial view of the image produced at a distance of about 1000 m from the target tracking device by a horizontally sharply collimated transmitted beam and by a vertically sharply collimated transmitted beam in the target tracking device of FIG. 1.

As can be seen in FIG. 3, a laser pulse train is emitted whenever the speed of the oscillatory movement of the associated laser transmitting diode 20 or 21 is the greatest. This corresponds to the 90° sector extending symmetrically and to both sides of each point where the laser diode 20 or 21 passes through its zero position, which position lies in the optical axis of the associated transmitting objective lens 18 or 19.

Since, during each oscillating period, each laser diode 20, 21 passes twice through its zero position, with the zero positions of one diode being phase shifted by 90° relative to those of the other diode, one laser transmitting diode 20 or 21, respectively emits a laser pulse train while the other laser transmitting diode 21 or 20, respectively, is switched off. The pulse trains from both laser transmitting diodes 20 and 21 are thus interlaced, so to speak.

By appropriately configuring transmitting objective lenses 18, 19 and laser transmitting diodes 20, 21, respectively, the laser pulses from laser transmitting diodes 20 are sharply collimated in the horizontal direction and the laser pulses of laser transmitting diode 21 are sharply collimated in the vertical direction. Each laser pulse thus produces, for example in a vertical plane at a distance of 1000 m from measuring head 10, a beam pattern 27 or 28 as shown in FIG. 3 in the form of a respective black bar. Each black bar depicts the beam pattern existing when the associated diode is at its zero position. The high pulse frequency causes the eye to simultaneously see a sharply horizontally collimated transmitted beam 27 generated by laser transmitting diode 20 and extending horizontally over about 20 cm with a vertical height of about 5 m and a transmitted beam 28 generated by laser transmitting diode 21, which beam extends vertically over about 20 cm and has a horizontal length of about 5 m, all with reference to an observation distance of about 1000 m. As indicated by the arrows in FIG. 3, the horizontal oscillating movement of laser transmitting diode 20 causes transmitted beam 27 to sweep horizontally over a path of about 20 m—with reference to an observation distance of about 1000 m—and the vertical oscillation of laser transmitting diode 21 causes transmitted beam 28 to sweep over a path of the same length in the vertical direction.

If measuring head 10 is aligned with the target or object, at least one of the laser pulses emitted during a full oscillation of each laser transmitting diode 20, 21 impinges on a triple reflector of the ring of reflectors attached to the target or object and is reflected from there to travel, via objective lens 22 and receiver 17, to photodiode 23. In order to cover the entire sweep range of laser transmitting diodes 20, 21, objective lens 22 of receiver 17 has an aperture angle, or field of view, which covers at least the sweep range of transmitted beam 27 in the horizontal direction and the sweep range of transmitted beam 28 in the vertical direction. As can be seen in FIG. 3, this would be a sweep range of 20 m each for a maximum range of 1000 m.

The reflected laser pulses received by photodiode 23, so-called light echoes, are fed to first and second regulating circuits 29 and 30 which are connected with receiver 17. Regulating circuit 29 includes a sensor 31 and regulating circuit 30 includes a sensor 32. Each sensor 31, 32 detects the momentary position of corresponding laser transmitting diode 20, 21 in the form of an electrical signal whose value is proportional to the deflection of the respective laser transmitting diode 20, 21 from its zero position lying in the optical axis of its associated objective lens. Whenever a light echo is detected by photodiode 23 of receiver 17, regulating circuit 29 or 30, respectively generates a setting voltage which is proportional to the instantaneous deflection of the associated laser transmitting diode 20, 21 from its zero position. This setting voltage is fed to the associated servo drives 13, 14 in such a manner that measuring head 10 is pivoted about each axis in a direction to cause the position of each laser transmitting diode when its beam strikes the target to correspond to the zero position of that diode.

A suitable configuration and operation of regulating circuit 29 which detects the deflection of horizontally oscillating laser transmitting diode 20 and correspondingly actuates horizontal servo drive 13 to rotate measuring head 10 about its vertical axis 11 are described in detail in DE-OS No. 3,128,433. Regulating circuit 30 has the identical configuration with the exception that it detects, via sensor 32, the deflection of the vertically oscillating laser transmitting diode 21 and converts it into a corresponding setting value for vertical servo drive 14 to correspondingly adjust measuring head 10 about its horizontal axis 12. Both regulating circuits 29, 30 operate at the same speed since both receive regulating information at the same rate.

As described in DE-OS No. 3,128,433, the target tracking device described here can be complemented to provide a device for the continuous position determination of the tracked target or object. For this purpose, it is merely necessary to detect the rotation angle of measuring head 10 about vertical axis 11 and about horizontal axis 12, which is possible, for example, by means of an incremental rotation sensor for each axis.

To determine the distance of the object from measuring head 10, one or both optical transmitters 15, 16 together with optical receiver 17 can be supplemented by an additional pulse delay measuring and evaluating unit to provide an active optical range finder as described in DE-OS No. 3,128,433. In the same way as described in the above-mentioned DE-OS, the oscillating amplitude of both laser transmitting diodes 20, 21 can also be varied for the purpose of making the oscillating amplitude very large when the target is lost so that it can be found again more quickly.

It will be understood that the above description of the present invention is susceptible to various modifications, changes and adaptations, and the same are intended to be comprehended within the meaning and range of equivalents of the appended claims.

What is claimed is:

1. In a device for automatically tracking a moving object, which device includes: an optical measuring head rotatable about vertical and horizontal axes, the measuring head having a first light transmitter for producing and emitting a horizontally sharply collimated light beam along a first beam axis, the first transmitter being operative to cyclically sweep the first beam axis horizontally over a given range about a zero position, and an optical receiver mounted to receive light echoes generated by reflections of the beam emitted by the first transmitter and having an optical axis oriented parallel to the first beam axis when the first beam axis is at the zero posiiton, the device further including motorized horizontal and vertical servo drives connected for rotating the measuring head about the vertical and horizontal axes, and a first regulating circuit connected to the receiver for converting the amplitude of the momentary horizontal deflection of the first beam axis from its zero position, when a light echo of the beam emitted by the first light transmitter is received by the receiver, to a setting value for the horizontal servo drive to adjust the horizontal orientation of the measuring head in the sense of reducing that amplitude of the momentary horizontal deflection of the first beam axis, the improvement wherein said optical measuring head further has a second light transmitter for producing and emitting a vertically sharply collimated light beam along a second beam axis, said second transmitter being operative to cyclically sweep the second beam axis vertically over a given range about a zero position, the zero position of the second beam axis being parallel to the optical axis of said receiver and said device further comprises: a second regulating circuit connected to said receiver for converting the amplitude of the momentary vertical deflection of the second beam axis from its zero position, when a light echo of the beam produced by said second transmitter is received by said receiver, to a setting value for the vertical servo drive to adjust the vertical orientation of said measuring head in the sense of reducing that amplitude of the momentary vertical deflection of the second beam axis; and control means connected to said first and second light transmitters for causing each said transmitter to alternately produce its associated light beam during successive, spaced periods.

2. A device as defined in claim 1 wherein said control means operate to switch off one said transmitter during each period when the other said transmitter is producing a light beam.

3. A device as defined in claim 2, wherein said first and second transmitters are operated for causing the cyclic sweeping of one transmitted beam axis through its associated zero position to be shifted in phase by 90° relative to the cyclic sweeping of the other transmitted beam axis through its associated zero position, and said control means are operative for causing each said transmitter to produce a beam during each half sweep cycle only within 45° on either side of the zero position of the associated given range.

4. A device as defined in claim 3 wherein the beam produced by each said transmitter during each period is composed of a succession of light pulses at a repetition rate higher than the frequency of the cyclic sweeping of the associated beam axis.

5. A device as defined in claim 4 wherein each said transmitter comprises a laser light source for producing its associated light beam.

6. A device as defined in claim 4 wherein each said transmitter comprises an objective lens, a light producing diode, and means for imparting to said diode an oscillatory movement, for producing the associated beam axis sweep, in the focal plane of said objective lens, said receiver comprises an objective lens, and all of said objective lenses have optical axes oriented parallel to one another.

7. A device as defined in claim 6 wherein said objective lenses of said transmitters are positioned symmetrically relative to said objective lens of said receiver.

8. A device as defined in claim 3 wherein each said transmitter comprises an objective lens, a light producing diode, and means for imparting to said diode an oscillating movement, for producing the associated beam axis sweep, in the focal plane of said objective lens, said receiver comprises an objective lens, and all of said objective lenses have optical axes oriented parallel to one another.

9. A device as defined in claim 8 wherein said objective lenses of said transmitters are positioned symmetrically relative to said objective lens of said receiver.

10. A device as defined in claim 2 wherein the beam produced by each said transmitter during each period is composed of a succession of light pulses at a repetition rate higher than the frequency of the cyclic sweeping of the associated beam axis.

11. A device as defined in claim 10 wherein each said transmitter comprises a laser light source for producing its associated light beam.

12. A device as defined in claim 2 wherein each said transmitter comprises an objective lens, a light producing diode, and means for imparting to said diode an oscillatory movement, for producing the associated beam axis sweep, in the focal plane of said objective lens, said receiver comprises an objective lens, and all of said objective lenses have optical axes oriented parallel to one another.

13. A device as defined in claim 12 wherein said objective lenses of said transmitters are positioned symmetrically relative to said objective lens of said receiver.

* * * * *